United States Patent [19]

Hodgetts

[11] Patent Number: 4,842,471
[45] Date of Patent: Jun. 27, 1989

[54] UNLOADING MECHANISM FOR TRUCKS AND TRAILERS

[75] Inventor: Graham L. Hodgetts, Mars, Pa.

[73] Assignee: Rolflor Industries, Inc., Warrendale, Pa.

[21] Appl. No.: 195,268

[22] Filed: May 17, 1988

[51] Int. Cl.$^4$ .......................... B60P 1/00; B65G 65/42
[52] U.S. Cl. ..................................... 414/515; 414/514; 414/527; 414/521
[58] Field of Search ............... 414/509, 510, 514, 515, 414/521, 527, 528

[56] References Cited

U.S. PATENT DOCUMENTS

| 4,162,735 | 7/1979 | Lewis | 414/514 |
| 4,431,360 | 3/1984 | Maeno | 414/509 X |
| 4,749,325 | 6/1988 | Hodgetts | 414/527 X |
| 4,760,971 | 8/1988 | Hodgetts | 242/67.1 R |

FOREIGN PATENT DOCUMENTS

| 0582008 | 9/1958 | Italy | 414/514 |
| 0018431 | 1/1985 | Japan | 414/514 |

Primary Examiner—Frank E. Werner
Assistant Examiner—G. Cundiff
Attorney, Agent, or Firm—Fleit, Jacobson, Cohn, Price, Holman & Stern

[57] ABSTRACT

An unloading mechanism for a truck or trailer has a conveyor belt which runs on the bed of the truck or trailer between forward and rearward wind-up rolls. A bulkhead is attached to the conveyor belt for pushing a load out the back of the back or trailer. Extending and retracting brace rods are provided on the bulkhead for automatic extension and retraction between relatively vertical positions when the bulkhead is located at a forward loading position in the truck or trailer and relatively inclined support positions when the bulkhead moves beyond the back opening of the truck or trailer. In the relatively inclined positions, the bracing rods resist tipping of the bulkhead about its connection with the conveyor belt thereby stablizing the load pushing forces when the load is moved beyond the back end of the truck or trailer.

6 Claims, 2 Drawing Sheets

UNLOADING MECHANISM FOR TRUCKS AND TRAILERS

BACKGROUND OF THE INVENTION

It is often desirable to provide a load-transporting vehicle, such as a truck or trailer, with a self-contained automatic unloading mechanism for mechanically discharging a load from within the vehicle, thereby economizing on labor.

One proposal, for example, comprises a bulkhead or pusher contained within the vehicle body linked to a belt or cable which runs along the bed of the vehicle between front and rear wind-up rolls. For loading the vehicle, the bulkhead would be moved to the front of the vehicle and the vehicle loaded behind the bulkhead. For unloading the vehicle, the belt or cable would be wound onto the rear wind-up roll, which might be situated under the vehicle bed at its rear, whereby the bulkhead pushes the load out the back of the vehicle.

When unloading a vehicle in the above manner onto a loading dock which is substantially level with the bed of the vehicle, it is advantageous to be able to push the load beyond the end of the vehicle and beyond the adjacent edge of the dock so that, for example, if the dock has a doorway, the load can be pushed through the doorway to a position where it is protected from the environment. For this purpose, it is necessary that the bulkhead have a depth (lengthwise of the vehicle) sufficient for its back pushing surface to be moved the required distance beyond the backend of the vehicle. Further, the bulkhead should be linked to the belt or cable only at or near the frontend of the bulkhead to enable the back surface of the bulkhead to be moved beyond the back wind-up roll. With this arrangement, however, when the bulkhead is moved beyond the backend of the vehicle, forces imposed thereon by the load tend to tilt or tip the bulkhead backwards about its front end connection with the belt or cable, resulting in an uneven pushing force on the load in the vertical direction and possible instability of the load to the extent that the pushing operation may have to be terminated before the required load position is obtained. Moreover, if the bulkhead was supported, for example by angled braces extending toward the front of the vehicle, such braces would take up space lengthwise at the front of the vehicle in the loading position of the bulkhead, thereby reducing the loading space available behind the bulkhead.

SUMMARY OF THE INVENTION

It is an object of the invention to provide a practical vehicle unloading system of the general type described above, which is capable of pushing a load beyond the end of the vehicle in a stable and secure manner.

Another object of the invention is to provide a bulkhead-type vehicle unloading system which provides a means of bracing the bulkhead against backward tipping or tilting when the bulkhead is used to push a load beyond the backend of the vehicle, but which means does not unduly restrict the vehicle loading space when the bulkhead is located at the front of the vehicle.

In fulfillment of the above and other objects, the invention provides a vehicle unloading mechanism of the bulkhead-type generally described above which includes an automatically retracting bulkhead bracing arrangement. Thus, in a preferred form of the invention, the bulkhead is provided with a pair of extending and retracting bracing rods, slidably received in slots provided on the forward side of the bulkhead, i.e. the side opposite the load, with the rods straddling the belt or cable to which the bulkhead is attached and resting on the bed of the vehicle.

When the bulkhead is at the forward end of the vehicle body, for loading, the rods are stowed in a relatively vertical orientation occupying relatively little space lengthwise of the vehicle. As the bulkhead moves back along the vehicle bed to discharge a load, the rods slide in the slots, progressively becoming more and more horizontal. (The rods may be provided at the top ends with pins or the like forming stops which prevent the rods from sliding out of the slots.) Then, when the bulkhead pushes the load beyond the back opening of the vehicle onto a loading dock or the like, the rods react against the bed of the vehicle to resist backward tipping of the bulkhead as described above. When the bulkhead is moved to the front of the vehicle, the rods are automatically returned to their retracted, most vertical position, due to friction between the feet of the rods and the bed of the vehicle and/or engagement of the feet against a front wall of the vehicle.

It is evident that the invention provides a simple yet effective means for stabilizing the bulkhead when pushing a load beyond the end of the vehicle without unduly infringing on the available vehicle load space when the bulkhead is in its forward position. Additional features and advantages of the invention will become apparent from the ensuing description and claims taken in conjunction with the attached drawings.

DESCRIPTION OF PREFERRED EMBODIMENT

Figure 1:
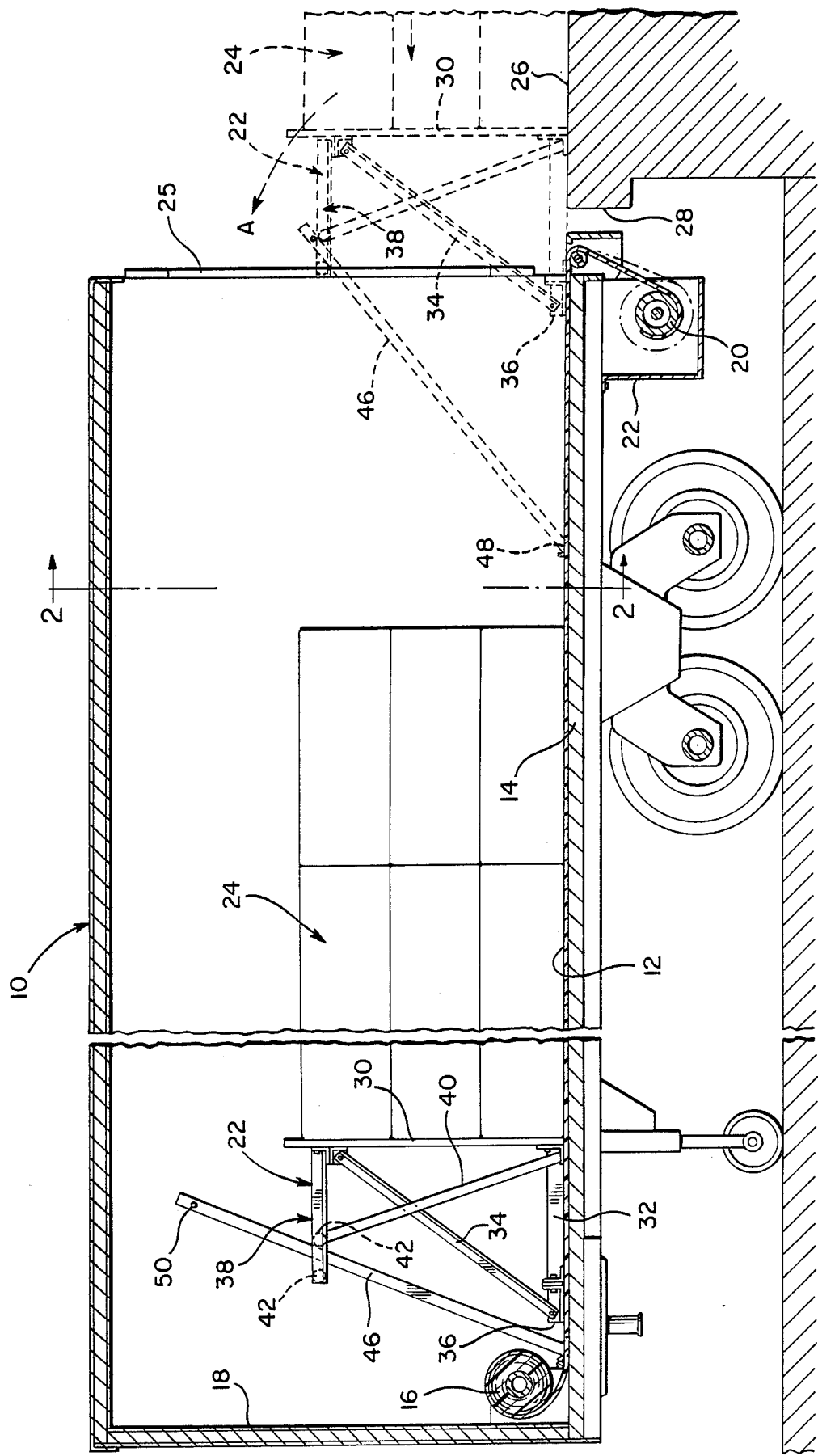
FIG. 1 is a sectional side elevation of a trailer body equipped with an automatic unloading mechanism in accordance with the invention.
Figure 2:
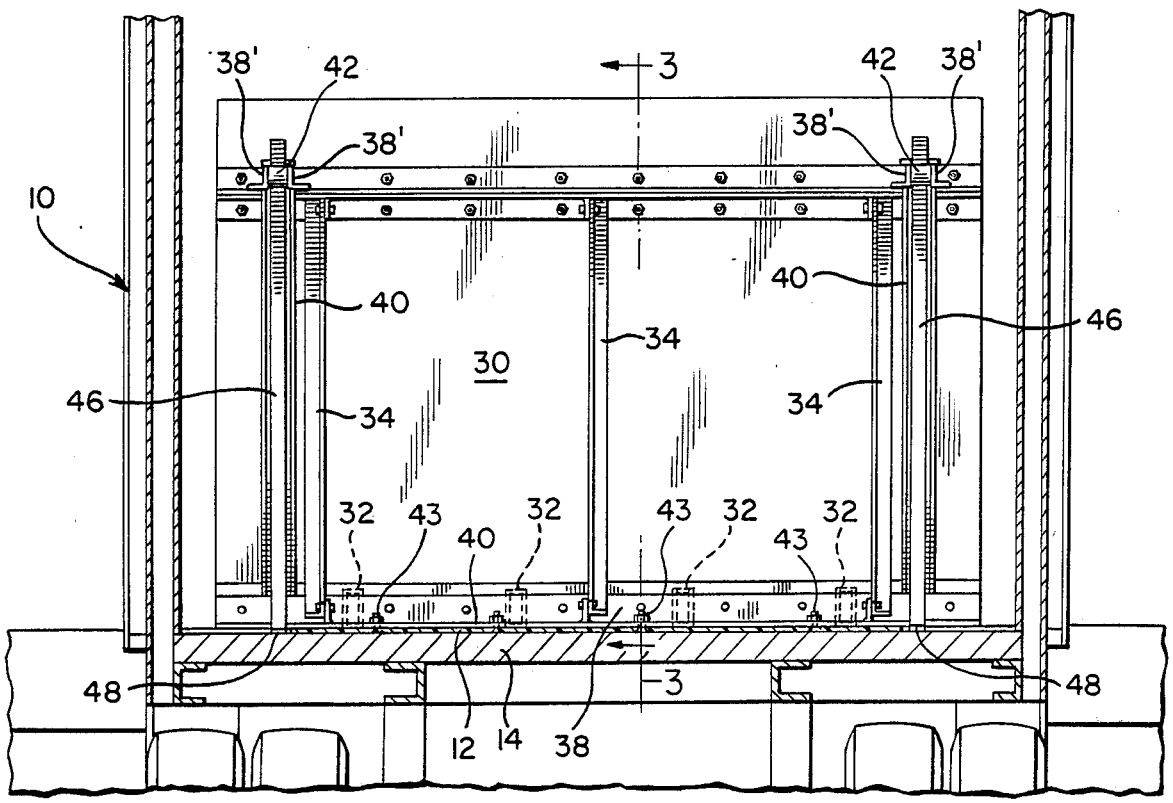
FIG. 2 is a sectional view on line 2—2 of FIG. 1.
Figure 4:
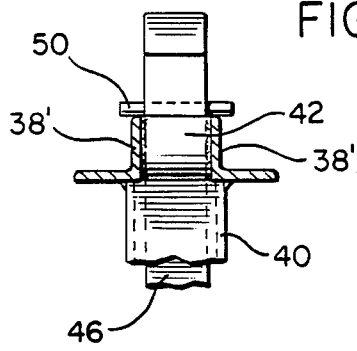
FIG. 4 is a sectional view on line 4—4 of FIG. 3.

A trailer body 10 is of a generally well known type used for load transporting, and is provided with an unloading mechanism in accordance with the invention.

Broadly stated, the unloading mechanism includes a conveyor belt 12 which runs on the bed 14 of the trailer body and which is attached at one end to a front wind-up roll 16 located internally adjacent a front wall 18 of the trailer body and a rear wind-up roll 20 which may, for example, be located in a housing 22 under the back of the trailer bed. Respective drive mechanisms of any suitable type may be provided for the respective rolls 16 and 20 so as to wind the belt thereon. For example, the rolls may be provided with drive mechanisms of the type disclosed in co-pending patent application Ser. No. 024,719, filed Mar. 11, 1987 and its continuation-in-part application filed Dec. 10, 1987, which are commonly assigned herewith. The disclosures of these co-pending patent applications are expressly incorporated herein by reference.

The trailer unloading mechanism further includes a bulkhead structure, generally indicated by reference 22, which bulkhead structure is attached to belt 12 in a manner to be described. When the belt 14 is wound onto the forward roll 16 the bulkhead structure 22 is located in a loading position adjacent the front wall 18 of the trailer as shown in full line in FIG. 1. A load 24 may then be loaded into the trailer behind the bulkhead structure. In order to unload the vehicle, belt 12 is wound onto the back wind-up roll 20 whereby the bulkhead structure pushes the load 24 out the back end 26 of the trailer. Further, as shown in dashed line in FIG. 1, the bulkhead structure 22 can move beyond the back end 26 of the trailer in order to push the load 24, for example, onto a loading dock 26 to a distance beyond the edge 28 of the loading dock. Thus, the load may be pushed onto the loading dock by a distance approaching the overall depth of the bulkhead structure lengthwise of the trailer.

Figure 3:
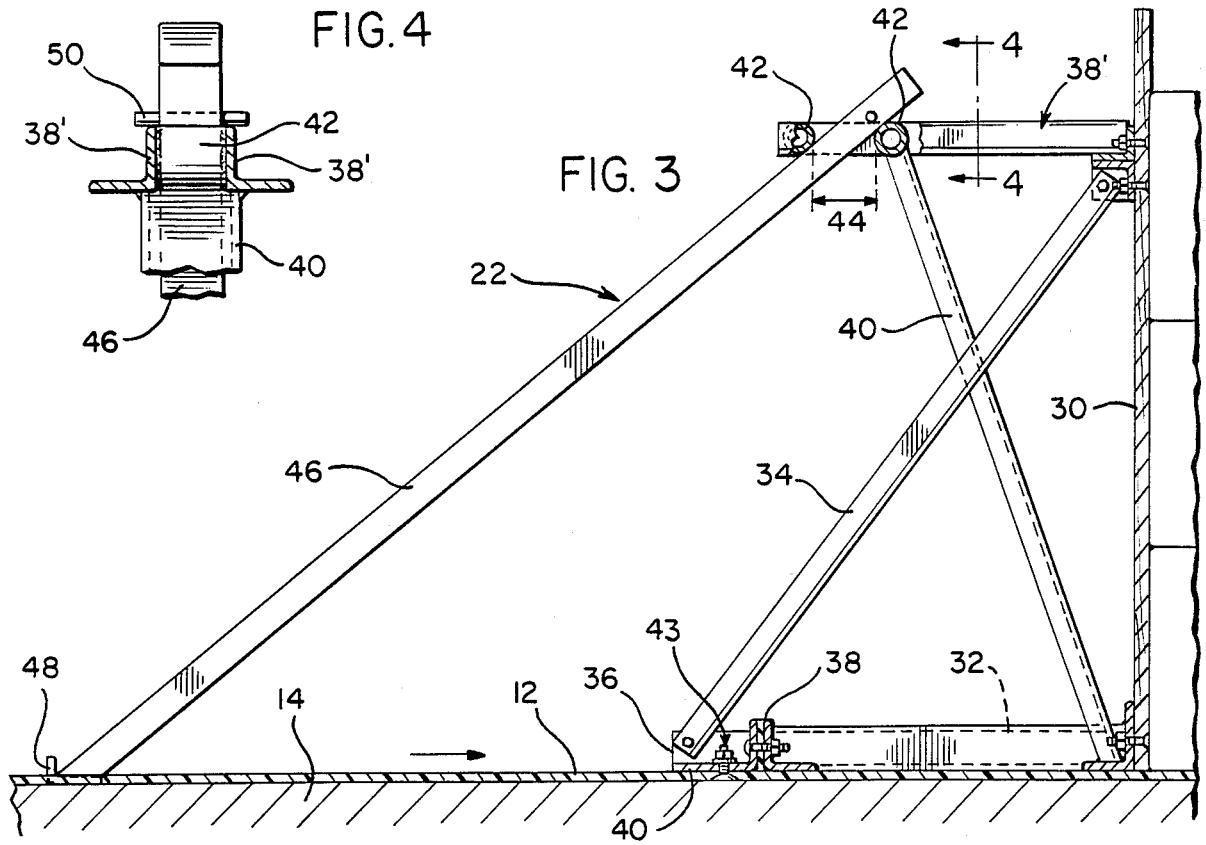
FIG. 3 is an enlarged sectional side elevation of a bulkhead structure used in the unloading mechanism.

In greater detail, the bulkhead structure 22 may, for example, comprise a vertical plate 30 for engaging the load and a supporting framework for plate 30 including forwardly extending horizontal base supports 32 and angled braces 34 connected between a forward end of the base and the plate 30. Further, the bulkhead is only connected to the belt 12 adjacent the forward end 36 of the bulkhead base. For example, the base may include a laterally extending bar assembly 38 connected, as by welding, to the horizontal members 32 with one horizontal flange element 40 of the bar assembly (FIG. 3) being connected to the belt by suitable bolt and nut or other type connectors 43. By connecting only the forward end of the bulkhead structure to the belt 12, the pusher plate 30 of the bulkhead may be moved beyond the end of the trailer as shown in dashed line in FIG. 1.

The actual components from which the bulkhead structure, as discussed above, is made and their manner of assembly will be readily apparent to those skilled in the art and accordingly such structure will not be described in more detail.

In order to prevent the bulkhead structure as described above from tipping or tilting about the connectors 43 in the general direction of arrow A, FIG. 1, when the bulkhead is pushing a load beyond the back end of trailer 26, the bulkhead is provided with an automatically extending and retracting bracing system as will now be described.

Suitably attached to the rear surface of plate 30 adjacent its upper end, are a pair of forwardly extending arm structures 38 which may, for example, comprise back to back angle section elements 38'. The arm structures 38 are spaced apart laterally so as to be located just beyond the respective longitudinal edges of the belt 12, and the structures may, for example, be supported by angled braces 40 secured for example to the back end of the bulkhead base. Toward the forward most end of the respective arm structures there are provided respective pairs of tubular or like cross members 42 which may be welded or otherwise secured between the respective angle members 38'. Thus, the respective cross members 42 define respective slots indicated generally by reference 44 in FIG. 3 which slots extend lengthwise of the respective arm structures 38'.

Located in each of the slots 44 is an automatically extending and retracting bracing rod 46 which may, for example, be a box section member with a foot 48 at its lower end which runs on the bed 14 of the trailer adjacent the edge of belt 12. At the upper end of each rod 46 there is provided a transverse pin 50 which prevents the rod sliding out of its respective slot 44, the pins 50 having sufficient length to engage the respective angle members 38'. It is evident from the Figures that the overall height of rod 46 is somewhat in excess of the height of arms 38' above the bed of the trailer. The rods 46 are able to slide in the slots 44 between a relatively vertical position of the rods shown in full line in FIG. 1 and a relatively inclined position of the rods shown in dash line of FIG. 1.

When the bulkhead structure 22 is in its forwardmost loading position adjacent front wall 18 of the trailer, the bracing rods 46 are in their stowed most vertical position as shown in FIG. 1. When the belt 12 is wound onto the back roll 20 in order to unload the vehicle, the bulkhead plate 30 pushes the load out the back end of the trailer and as the bulkhead moves back, the rods 46 progressively slide in the slots 44, the feet 48 of the rods resting on the bed of the trailer, until the pins 50 engage the angled members 38' and the rods 46 are in their most inclined position. Thus, when the bulkhead pushes the load 24 onto the loading dock 26 beyond the back end 25 of the trailer, any force tending to tip the bulkhead backwards in the direction of arrow A is resisted by the bracing rods 46 reacting against the bed of the trailer, such forces being transmitted through the respective tubular connector elements 43. Thus, the load 24 may be pushed evenly and securely along the dock surface substantially without any tendency for the bulkhead structure to be tipped up about its connection with belt 12.

When the bulkhead structure is moved back to its loading position at the front end of the trailer, the rods 46 will slide up the slots 44 and return to their most vertical position, either by friction between the feet 48 and the bed of the trailer or when the feet 48 engage a front surface of the trailer body. Thus, in the forwardmost position of the bulkhead structure the bracing rods 46 are substantially vertically oriented so as to minimize the amount of loading space which is sacrificed by their presence.

It is further evident from the above that the unloading mechanism provides an extremely simple but effective means for bracing the bulkhead structure when pushing a load beyond the back end of the trailer without substantially effecting the trailer load space.

While only a preferred embodiment of the invention has been described herein in detail, the invention is not limited thereby and modifications can be made within the scope of the attached claims.

What is claimed is:

1. An unloading mechanism for a load carrying wheeled vehicle, such as a truck or trailer, which has a bed, a front wall, and a back opening through which the vehicle is to be unloaded, said mechanism including a flexible conveyor on the bed of the vehicle, a forward conveyor wind-up roll adjacent the front wall of the vehicle, a rear conveyor wind-up roll adjacent the back opening of the vehicle, a bulkhead structure attached to the conveyor for location adjacent the front wall of the vehicle when the conveyor is wound on said forward roll and for pushing a load out the back opening of the vehicle as the conveyor is wound on said rear roll, the bulkhead structure having a rear pusher element and a base extending forwardly of said pusher element, attachment means securing said base to the conveyor at a distance from the pusher element whereby the pusher element may be moved rearwardly beyond the back opening of the vehicle when pushing a load out the opening, and automatically extending and retracting elongate brace means slidably mounted on the bulkhead structure and in contact with the vehicle bed adjacent the conveyor forwardly of said pusher element for extending to a relatively inclined position and reacting against the bed of the vehicle to resist tipping of the bulkhead structure about said attachment means when the bulkhead structure pushes a load rearwardly beyond said opening, and for retracting to a relatively vertical position when the bulkhead structure is located adjacent the front wall of the vehicle to minimize the lengthwise space occupied thereby.

2. A mechanism as defined in claim 1 wherein the bracing means comprises a pair of bracing rods which straddle the conveyor and rest on the bed of the vehicle outside opposite edges of the conveyor respectively, the rods being received in respective lengthwise slots formed in the bulkhead structure forwardly of said pusher element and spaced above the base of the bulkhead structure.

3. A mechanism as defined in claim 2 wherein the bulkhead structure has a pair of arms extending forwardly from the pusher element above the base and wherein said slots are formed in said arms.

4. A mechanism as defined in claim 3 wherein each rod is provided with a transversely extending pin adjacent an upper end of the rod for engaging the respective arm and preventing the rod from sliding out of its respective slot.

5. A mechanism as defined in claim 4 wherein the bulkhead structure includes support members connected between the base and the respective arms.

6. A mechansim as defined in claim 1 wherein the conveyor is a conveyor belt.

* * * * *